United States Patent [19]

Shima et al.

[11] Patent Number: 5,841,937
[45] Date of Patent: Nov. 24, 1998

[54] APPARATUS AND METHODS FOR TRANSMITTING COMPRESSED DIGITAL DATA FROM RECORDING OR REPRODUCING APPARATUS

[75] Inventors: Hisato Shima, Chiba; Hiroyuki Ishimaru, Saitama, both of Japan

[73] Assignee: Sony Corporation, Tokyo, Japan

[21] Appl. No.: 388,492

[22] Filed: Feb. 14, 1995

[30] Foreign Application Priority Data

Feb. 15, 1994 [JP] Japan ..................... 6-040449

[51] Int. Cl.⁶ .......................... H04N 5/762; H04N 5/775; H04N 9/79; H04N 5/91
[52] U.S. Cl. .......................... 386/40; 386/122; 386/123; 360/32
[58] Field of Search .......................... 358/335, 342, 358/341, 343, 310; 360/19.1, 32, 48, 18; 371/30, 37.5, 38.1, 39.1; 348/385, 387; 386/36, 40–46, 121, 122, 123, 124; H04N 5/762, 5/775

[56] References Cited

U.S. PATENT DOCUMENTS

| | | | |
|---|---|---|---|
| 4,920,435 | 4/1990 | Yamazaki | 360/77.15 |
| 4,963,991 | 10/1990 | Honjo | 358/310 |
| 5,065,259 | 11/1991 | Kubota et al. | 360/32 |
| 5,067,131 | 11/1991 | Odaka et al. | 371/40.1 |
| 5,191,437 | 3/1993 | Kim | 358/337 |
| 5,321,562 | 6/1994 | Hamada et al. | 360/48 |
| 5,323,396 | 6/1994 | Lokhoff | 370/94.1 |
| 5,351,131 | 9/1994 | Nishino et al. | 358/335 |
| 5,384,665 | 1/1995 | Ohkuma et al. | 360/22 |
| 5,404,168 | 4/1995 | Tamada et al. | 348/405 |
| 5,416,651 | 5/1995 | Uetake et al. | 360/48 |
| 5,430,579 | 7/1995 | Onishi et al. | 360/19.1 |
| 5,446,597 | 8/1995 | Matsumi et al. | 360/19.1 |
| 5,459,621 | 10/1995 | Tsuji et al. | 360/32 |
| 5,463,505 | 10/1995 | Kaniwa et al. | 360/73.04 |
| 5,465,180 | 11/1995 | Amada et al. | 360/19.1 |
| 5,493,414 | 2/1996 | Inoue et al. | 358/336 |
| 5,543,932 | 8/1996 | Chang et al. | 358/335 |
| 5,557,420 | 9/1996 | Yanagihara et al. | 358/335 |
| 5,583,654 | 12/1996 | Oguro | 386/96 |

FOREIGN PATENT DOCUMENTS

| | | |
|---|---|---|
| 0 471 118 | 2/1992 | European Pat. Off. . |
| 0 498 617 | 8/1992 | European Pat. Off. . |
| 0 518 069 | 12/1992 | European Pat. Off. . |
| 43 21 488 | 1/1994 | Germany . |

Primary Examiner—Douglas W. Olms
Assistant Examiner—David R. Vincent
Attorney, Agent, or Firm—Frommer Lawrence & Haug LLP; William S. Frommer; Dennis M. Smid

[57] ABSTRACT

Apparatus and methods are provided for recording and reproducing digital image data. In a reproducing apparatus, two tracks of digital image data are simultaneously reproduced in a high definition mode of operation, while in a standard definition mode of operation only a single track of data is reproduced at a given time. In the high definition mode of operation, the data reproduced from the two tracks simultaneously are time-division multiplexed and supplied in multiplexed form to a digital interface for transmission to another apparatus, such as a recording apparatus for dubbing. In a recording apparatus, operating in a high definition mode digital image data is recorded simultaneously in two tracks on tape. In one embodiment, the data to be recorded is also multiplexed time-divisionally and supplied to a digital interface for transmission, but in a standard definition mode, the data is not multiplexed prior to transmission. In other embodiments, a recording apparatus is supplied with communication circuits for demultiplexing high definition image data received from a transmission line for simultaneously recording first and second portions of the image data in respective tracks on a tape.

12 Claims, 9 Drawing Sheets

FIG. 10

FIRST DIF BLOCK ↓     TRANSMISSION ORDER →

| $H_{0,0}$ | $H_{0,1}$ | $SC_{0,0}$ | $SC_{0,1}$ | $SC_{1,0}$ | $SC_{1,1}$ | $VA_{0,0}$ | $VA_{0,1}$ |
|---|---|---|---|---|---|---|---|
| $VA_{1,0}$ | $VA_{1,1}$ | $VA_{2,0}$ | $VA_{2,1}$ | $A_{0,0}$ | $A_{0,1}$ | $V_{0,0}$ | $V_{0,1}$ |
| $V_{1,0}$ | $V_{1,1}$ | $V_{2,0}$ | $V_{2,1}$ | $V_{3,0}$ | $V_{3,1}$ | $V_{4,0}$ | $V_{4,1}$ |
| $V_{5,0}$ | $V_{5,1}$ | $V_{6,0}$ | $V_{6,1}$ | $V_{7,0}$ | $V_{7,1}$ | $V_{8,0}$ | $V_{8,1}$ |
| $V_{9,0}$ | $V_{9,1}$ | $V_{10,0}$ | $V_{10,1}$ | $V_{11,0}$ | $V_{11,1}$ | $V_{12,0}$ | $V_{12,1}$ |
| $V_{13,0}$ | $V_{13,1}$ | $V_{14,0}$ | $V_{14,1}$ | $A_{1,0}$ | $A_{1,1}$ | $V_{15,0}$ | $V_{15,1}$ |
| $V_{16,0}$ | $V_{16,1}$ | $V_{17,0}$ | $V_{17,1}$ | $V_{18,0}$ | $V_{18,1}$ | $V_{19,0}$ | $V_{19,1}$ |
| $V_{20,0}$ | $V_{20,1}$ | $V_{21,0}$ | $V_{21,1}$ | $V_{22,0}$ | $V_{22,1}$ | $V_{23,0}$ | $V_{23,1}$ |
| ⋮ | ⋮ | ⋮ | ⋮ | ⋮ | ⋮ | ⋮ | ⋮ |
| $V_{116,0}$ | $V_{116,1}$ | $V_{117,0}$ | $V_{117,1}$ | $V_{118,0}$ | $V_{118,1}$ | $V_{119,0}$ | $V_{119,1}$ |
| $A_{8,0}$ | $A_{8,1}$ | $V_{120,0}$ | $V_{120,1}$ | $V_{121,0}$ | $V_{121,1}$ | $V_{122,0}$ | $V_{122,1}$ |
| $V_{123,0}$ | $V_{123,1}$ | $V_{124,0}$ | $V_{124,1}$ | $V_{125,0}$ | $V_{125,1}$ | $V_{126,0}$ | $V_{126,1}$ |
| $V_{127,0}$ | $V_{127,1}$ | $V_{128,0}$ | $V_{128,1}$ | $V_{129,0}$ | $V_{129,1}$ | $V_{130,0}$ | $V_{130,1}$ |
| $V_{131,0}$ | $V_{131,1}$ | $V_{132,0}$ | $V_{132,1}$ | $V_{133,0}$ | $V_{133,1}$ | $V_{134,0}$ | $V_{134,1}$ |

↑ LAST DIF BLOCK $H_{0,k}$ : HEADER DIF BLOCK 0, SECTION k  (k=0,1)
$SC_{i,k}$ : SUBCODE DIF BLOCK i, SECTION k  (i=0,1) (k=0,1)
$VA_{i,k}$ : VAUX DIF BLOCK i, SECTION k  (i=0,1,2),(k=0,1)
$A_{i,k}$ : AUDIO DIF BLOCK i, SECTION k  (i=0,⋯,8),(k=0,1)
$V_{i,k}$ : VIDEO DIF BLOCK i, SECTION k  (i=0,⋯,134),(k=0,1)

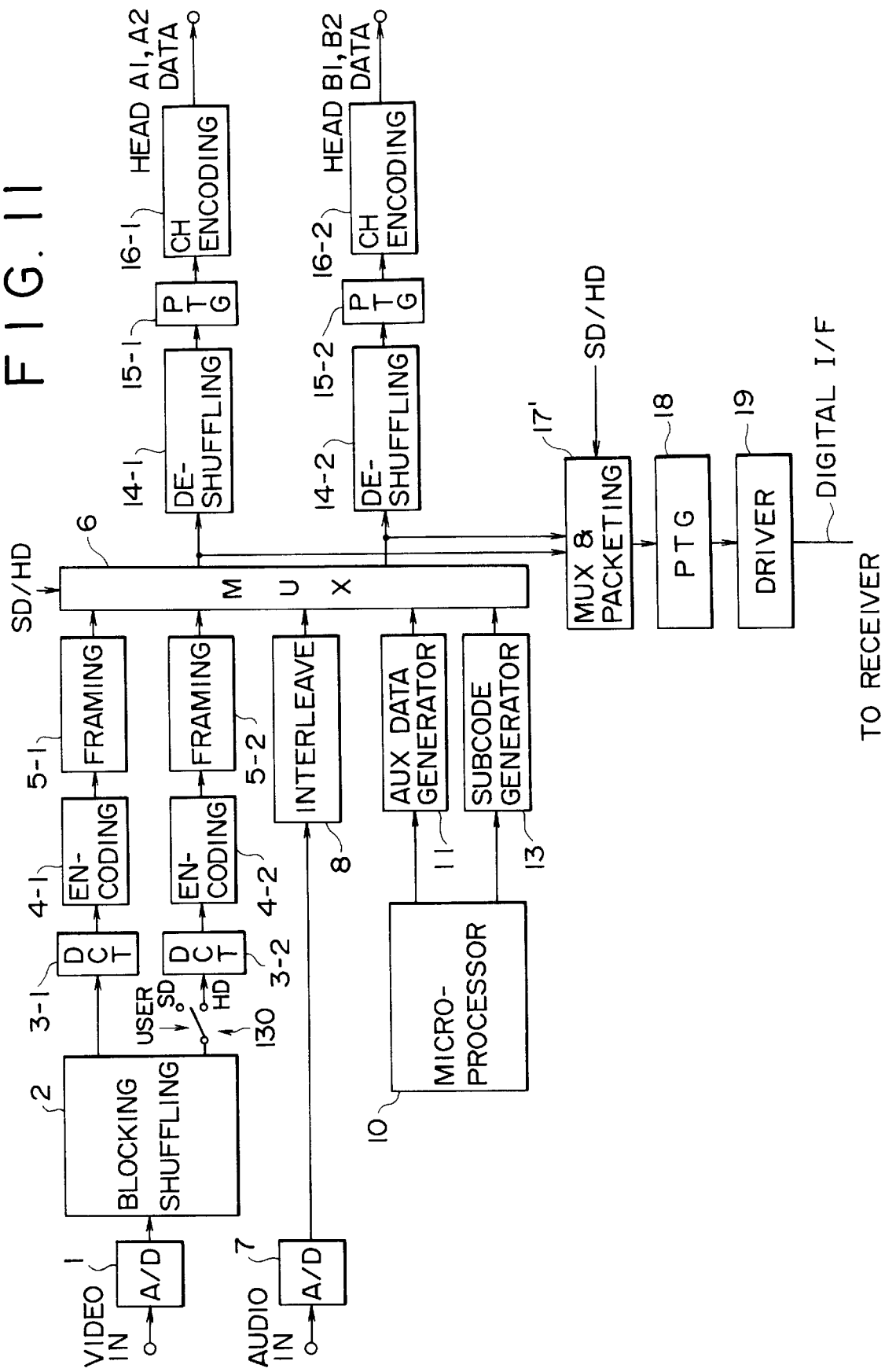

APPARATUS AND METHODS FOR TRANSMITTING COMPRESSED DIGITAL DATA FROM RECORDING OR REPRODUCING APPARATUS

BACKGROUND OF THE INVENTION

The present invention relates to apparatus and methods for transmitting compressed digital data, such as digital image and audio data, from a recording or reproducing apparatus to other apparatus.

Digital VTR's have been implemented for recording and reproducing standard definition (SD) digital video and audio signals on magnetic tape. Such VTR's carry out compression of the video signal in order to reduce the amount of data which must be recorded.

Digital high definition (HD) video systems have been proposed which would provide pictures having much higher resolution than SD systems. Implementation of HD digital video systems would require that HD digital VTR's be provided for recording and editing HD digital video data.

However, the amounts of data which must be processed by an HD digital VTR, and transmitted between such VTR's for dubbing, are considerably greater than in the case of digital VTR's which only record and reproduce SD video data. Consequently, to implement an HD digital VTR utilizing existing equipment designs would result in a much more expensive apparatus.

It is anticipated that, when HD digital video systems are put in use, SD systems will remain in use for some time. It would be desirable to minimize the amount and complexity of the equipment required for simultaneously operating both systems.

OBJECTS AND SUMMARY OF THE INVENTION

It is an object of the present invention to overcome the disadvantages of existing digital VTR's for implementing HD video systems.

It is another object of the present invention to provide apparatus for recording and/or reproducing HD digital image signals which employ circuits of minimal complexity to transmit and receive such signals from other apparatus.

It is a further object of the present invention in certain embodiments to provide economical apparatus for recording and/or reproducing both HD and SD digital image signals, as well as for transmitting or receiving such signals to or from other apparatus.

In accordance with an aspect of the present invention, apparatus and methods are provided for reproducing digital image data, comprising the means for and the steps of, respectively: simultaneously reproducing a first portion of the digital image data in a first track of a recording medium and a second portion of the digital image data in a second track of the recording medium, the first and second tracks each storing a predetermined amount of data therein; multiplexing the first and second portions of the image data on a time-divisional basis in block data units to produce multiplexed image data, each of the block data units including an amount of data which is less than the predetermined amount of data stored in either of the first and second tracks; and providing the multiplexed image data to a transmission line.

In accordance with another aspect of the present invention, apparatus and methods are provided for recording digital image data on a recording medium, comprising the means for and the steps of, respectively: receiving digital image data from a transmission line, the received digital image data including first and second data portions which have been time-division multiplexed in predetermined block units; demultiplexing the digital image data to supply the first data portion in a first data channel and the second data portion in a second data channel; and recording the first data portion in a first track in the recording medium and the second data portion in a second track in the recording medium, each of the first and second tracks recording an amount of data greater than an amount of data in each of the predetermined block units.

In accordance with a further aspect of the present invention, apparatus and methods are provided for recording digital image data, comprising the means for and the steps of, respectively: receiving a first portion of digital image data from a first data channel and a second portion of digital image data from a second data channel; recording the first portion of the digital image data in a first track in a recording medium and the second portion of the digital image data in a second track in the recording medium, each of the first and second tracks recording a predetermined amount of data therein; multiplexing the first and second portions of the digital image data on a time-divisional basis in block data units to produce multiplexed image data, each of the block data units including an amount of data which is less than the predetermined amount of data stored in either of the first and second tracks; and providing the multiplexed image data to a transmission line.

The above, and other objects, features and advantages of the invention, will be apparent in the following detailed description of certain illustrative embodiments thereof which is to be read in connection with the accompanying drawings forming a part hereof, and wherein corresponding parts and elements are identified by the same reference numerals in the several views of the drawings.

BRIEF DESCRIPTION OF THE DRAWINGS

FIG. 10 is a schematic diagram of a data subsequence format employed in transmitting data to and from apparatus in accordance with the various disclosed embodiments of the present invention; and FIG. 11 is a block diagram of another recording apparatus in accordance with a further embodiment of the present invention.

DETAILED DESCRIPTION OF CERTAIN ADVANTAGEOUS EMBODIMENTS

Figure 1:
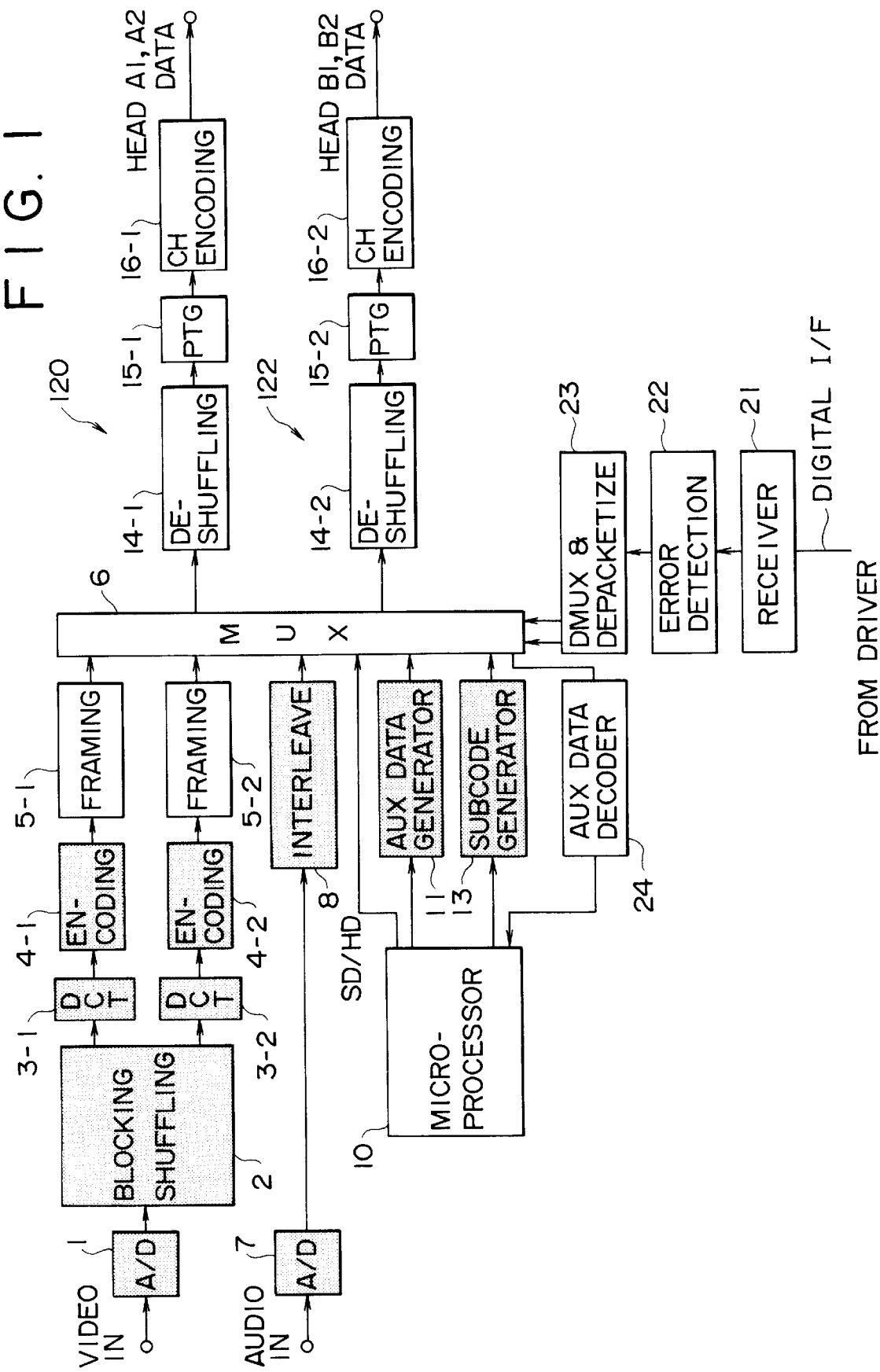
FIG. 1 is a block diagram of a recording apparatus in accordance with an embodiment of the present invention.

With reference to the drawings, and in particular to FIG. 1 thereof, a recording apparatus in accordance with a first embodiment of the present invention is illustrated in block form therein. The recording apparatus of FIG. 1 serves to record selectively either HD digital image signals or SD digital image signals in slant tracks on a magnetic tape, together with audio and subcode data in respective regions of each track. For recording an HD digital image signal, the apparatus of FIG. 1 splits the signal into first and second portions which it supplies to first and second channels, respectively, for processing and recording, each channel including corresponding processing circuitry designated respectively "-1" and "-2" in FIG. 1.

Figure 2:
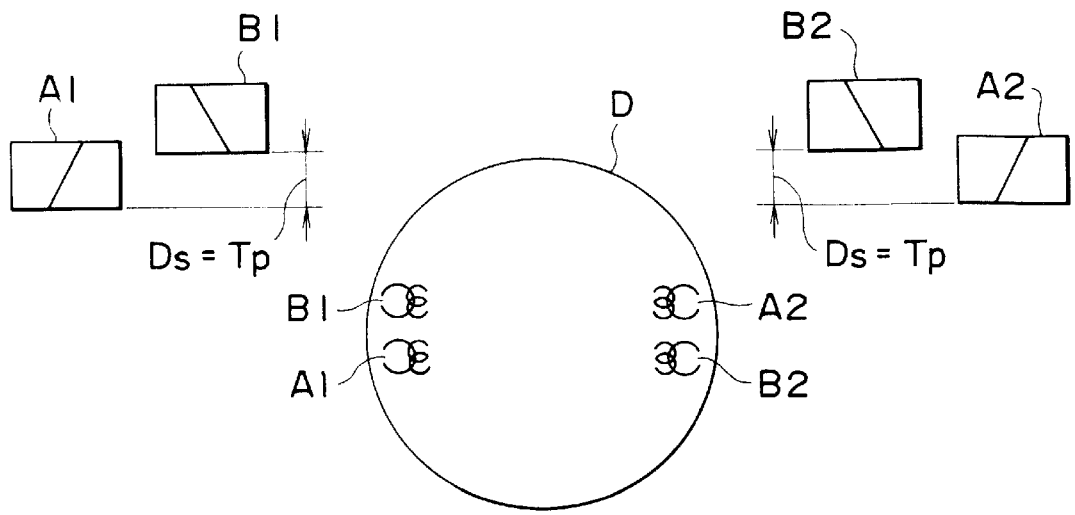
FIG. 2 is a schematic diagram of a rotating head drum for use in the embodiment of FIG. 1.

Channel 1 supplies HD digital image data to a pair of magnetic recording heads A1 and A2 arranged at diametrically opposed positions on a rotating drum D, as illustrated schematically in FIG. 2. Channel 2 supplies HD digital image data to a pair of heads B1 and B2 also arranged at diametrically opposed positions on the rotating drum D. Heads A1 and B1 are positioned closely adjacent to one another on the drum D at respective levels spaced by a distance $D_S$ so that they simultaneously record tracks on a magnetic tape (not shown for purposes of simplicity and clarity) having a track pitch $T_P$ equal to the distance $D_S$. Heads A1 and B1 also have respectively different azimuth angles.

The heads A2 and B2 are arranged adjacent to one another at respectively different levels on the drum D separated by the distance $D_S$, so that they simultaneously record tracks having a track pitch $T_P$. As in the case of heads A1 and B1, heads A2 and B2 have respectively different azimuth angles. Accordingly, the HD digital image data is separated into two channels, each of which is recorded at a respective track on magnetic tape simultaneously with the data of the other channel in an adjacent parallel track.

Figure 3:
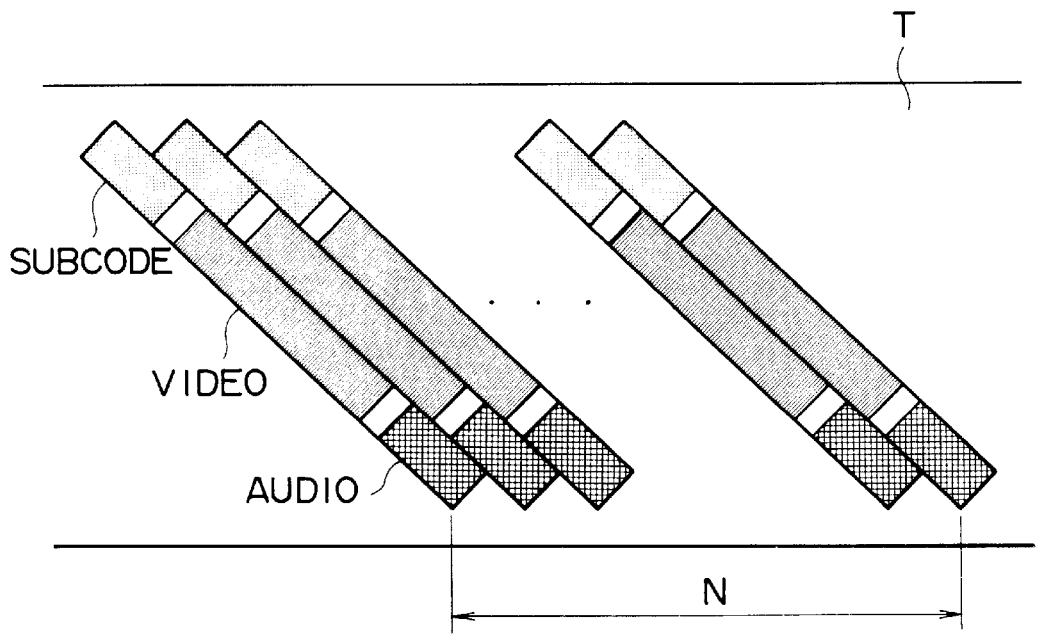
FIG. 3 is a schematic diagram of recording tracks formed on a magnetic tape with the use of the embodiment of FIG. 1.

For recording SD digital image data, the apparatus of FIG. 1 utilizes only one of the channels 1 or 2 for recording, so that the SD image signal is recorded in half the number of tracks per unit time as the HD signal. The recording apparatus of FIG. 1 also records digital audio and subcode data in each track. With reference also to FIG. 3, a schematic representation of the parallel tracks formed on a magnetic tape T by the apparatus of FIG. 1 is illustrated therein. It will be seen from FIG. 3 that the image or video signals are recorded in a central region of each track, and that the audio and subcode data are recorded in respective regions of each track on opposite sides of the video data region.

As indicated in FIG. 3, each frame of the image data is recorded in N adjacent tracks on the magnetic tape T. The drum D rotates at a rate of 150 revolutions per second. Accordingly, when the apparatus of FIG. 1 is used to record SD digital image signals according to the 525 line per frame and 60 field per second system (525/60), each frame is recorded in ten tracks. When recording SD digital image signals according to the 625/50 system, each frame is recorded in twelve tracks. However, when the apparatus of FIG. 1 records HD digital image signals according to the 1125/60 system, since the data is divided into two channels and recorded by four heads (instead of two heads in the case of the SD signal), each frame is recorded in twenty tracks, while in recording HD signals according to the 1250/50 system, each frame is recorded in twenty-four tracks.

Since the apparatus of FIG. 1 divides the HD signals into two separate tracks and simultaneously records two tracks of data, it is possible to employ relatively slower, and less expensive processing circuitry. Moreover, the head drum may be rotated at a standard speed of 150 revolutions per second both for recording SD and HD digital image signals. It will be appreciated that the recording apparatus of FIG. 1 thus employs relatively inexpensive circuitry for processing the signals to be recorded, as well as a relatively simple head drum servo system The construction and operation of the FIG. 1 apparatus will now be described in greater detail. An analog video signal, which may be either an HD or SD signal, is received at a Video In terminal and is converted to digital form by an A/D converter 1 which outputs only those portions of the digital data representing the image itself to a blocking and shuffling circuit 2. The circuit 2 divides the received data into blocks (referred to herein as "DCT blocks") each representing a respective image area including eight samples in a horizontal image direction and eight lines in a vertical image direction. The DCT blocks are assembled into macroblocks each including four luminance DCT blocks and two color difference DCT blocks. Each DCT block is later transformed by discrete cosine transformation, as explained below.

The macroblocks are then shuffled by the circuit 2 by grouping together five macroblocks from diverse areas of the image to form respective buffering units. This helps maintain a substantially uniform image resolution throughout each frame, as explained in greater detail below.

Figure 4A:
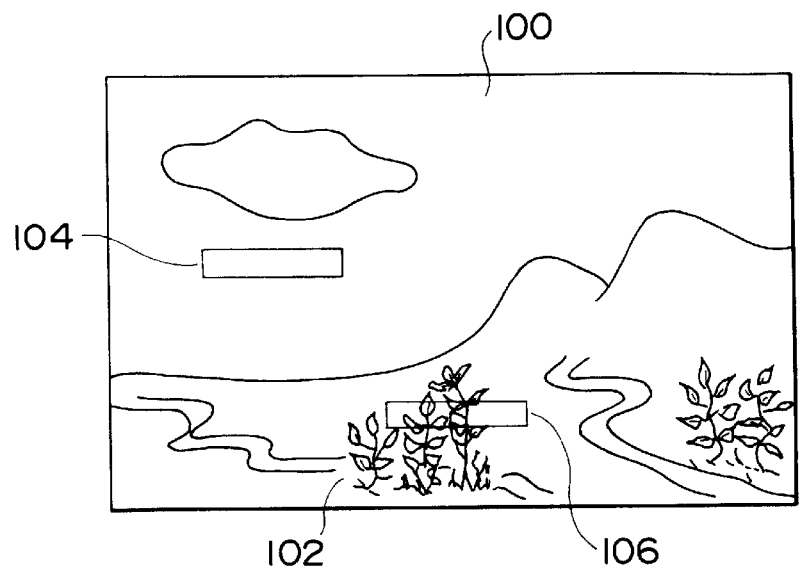
FIG. 4A is a exemplary illustration of an image represented by a frame of image data.
Figure 4B:
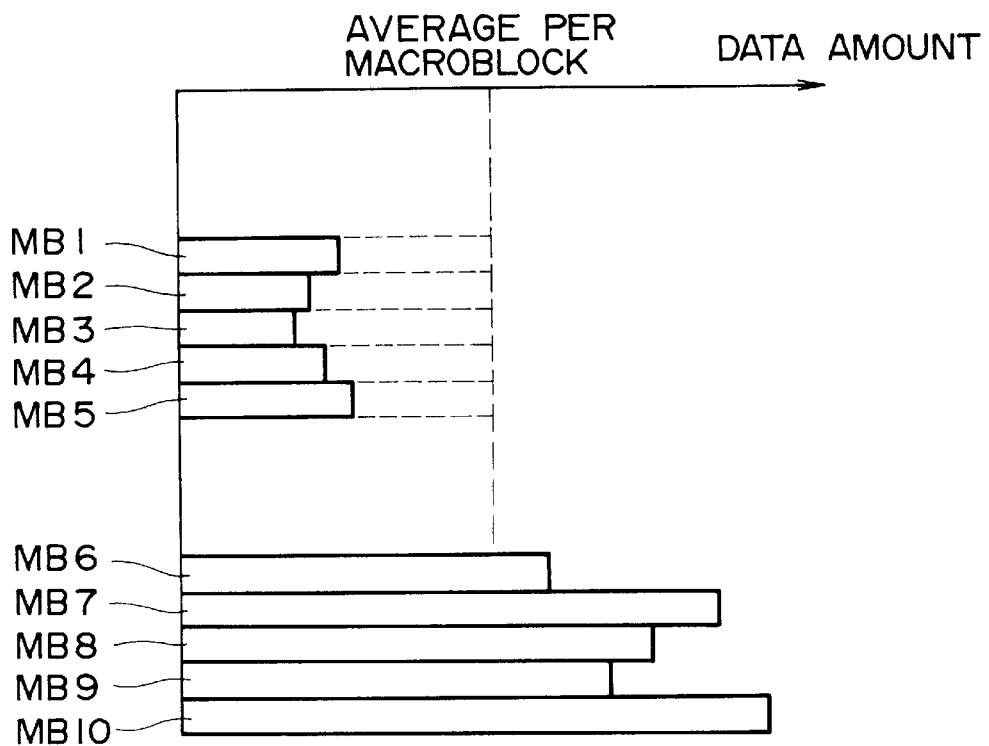
FIG. 4B is a chart representing exemplary data amounts of macroblocks of the image data representing the image of FIG. 4A.

The manner in which shuffling helps maintain uniform data amounts in each group of macroblocks will now be explained in connection with FIGS. 4A and 4B. FIG. 4A represents an image of a landscape depicting a sky 100 in the background and a region of foliage 102 in the foreground. It is assumed for the purposes of this explanation that a first group of five macroblocks 104 representing a portion of the sky background and a second group of five macroblocks 106 depicting a portion of the foliage in the foreground are extracted from the data representing this image. After discrete cosine transformation the amount of data in each of the five macroblocks within the group 104, indicated as macroblocks MB1 through MB5 typically would be relatively low as indicated in FIG. 4B. However, because of the far greater detail depicted by the macroblocks of the group 106, indicated as MB6 through MB10 in FIG. 4B, the amount of data in these macroblocks after discrete cosine transformation typically would be much larger, as indicated therein. The macroblocks are assembled into buffer units of a predetermined number of macroblocks and are then requantized as explained below, so that the amount of data in each buffer unit is then substantially uniform. Accordingly, if the macroblocks are not shuffled, but instead are requantized in buffer units selected from a contiguous region of the image, buffer units representing image portions which overall have relatively little detail will be requantized using relatively small quantization intervals, while buffer units representing relatively greater picture detail will be requantized using substantially larger quantization intervals. As a result, image resolution will vary disadvantageously within each image.

Figure 5:
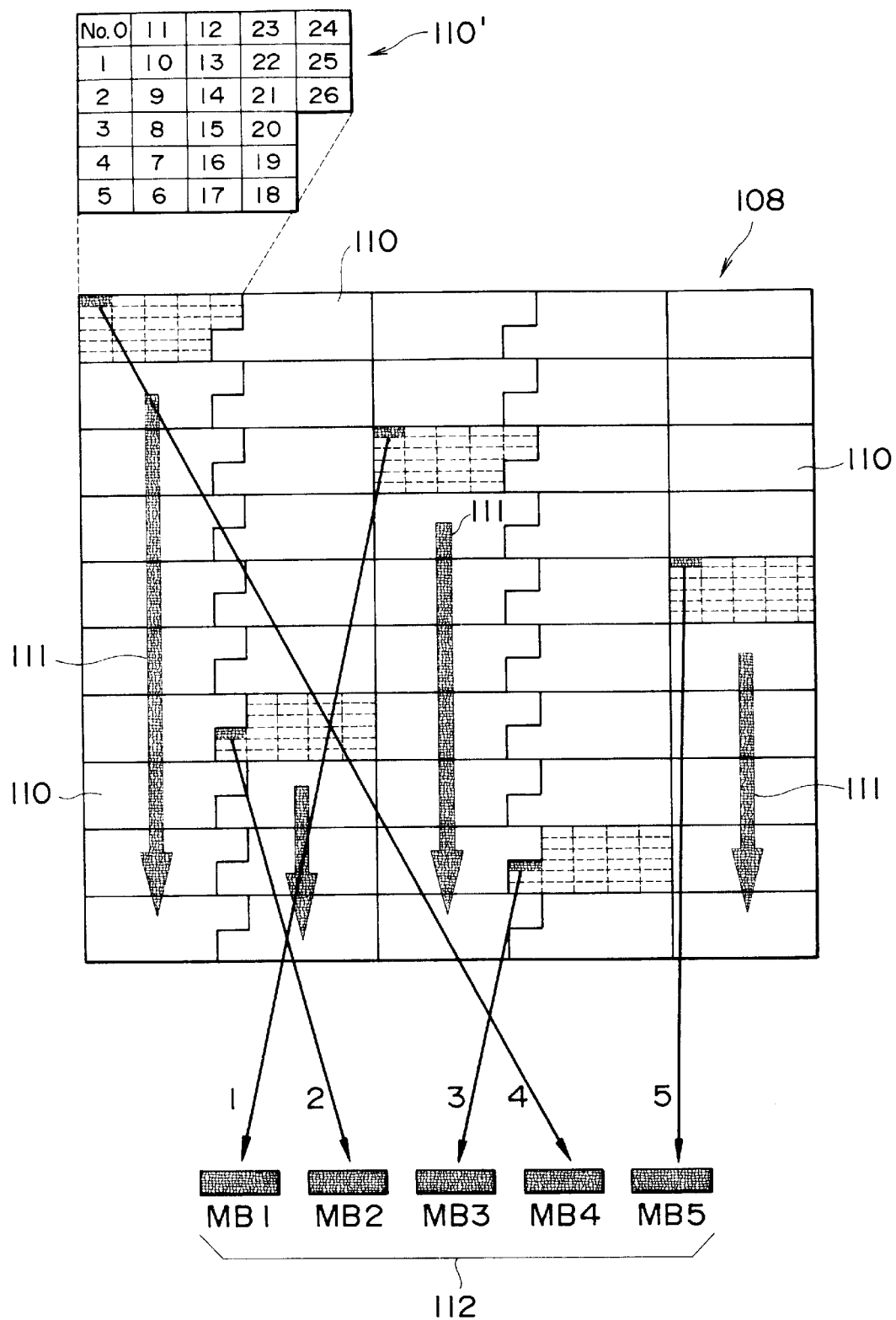
FIG. 5 is a schematic diagram for use in illustrating a shuffling process employed in the apparatus of FIG. 1.

In order to avoid this effect, shuffling is carried out, for example, in a manner as illustrated in FIG. 5 in the case of a 525/60 image signal. As shown in FIG. 5, each frame 108 of the image signal is divided into super macroblock regions 110, each of which includes 27 macroblocks. The super macroblocks are arranged generally in five vertical columns. The macroblocks are grouped in buffer units of five macroblocks 112 in accordance with a shuffling process by choosing each of the five macroblocks from a different one of five super macroblocks, one each from a different column and each of which is spaced from the others in this example by two rows of super macroblocks. Once the data of all five super macroblocks have been selected to form twenty-seven buffer units, then a further set of five macroblocks is selected in order to form twenty-seven further buffer units in the foregoing manner. As indicated by arrows 111 in FIG. 5, the five new macroblocks are selected as those five super macroblocks immediately below the five super macroblocks from which the preceding twenty-seven buffer units were formed, provided that once the macroblocks of a super macroblock at the bottom of a column have been read out to form buffer units, the next super macroblock selected from that column is the uppermost. The shuffling process for HD image signals is similar to that for the SD image signals.

In the case of the HD image signal, the shuffled macro blocks are then subjected to discrete cosine transformation by a pair of DCT circuits 3-1 and 3-2. The blocks of each macroblock are supplied by the circuit 2 to a respective one of the DCT circuits 3-1 and 3-2 so that the data are distributed between the first and second channels. In the case of the SD image signal, however, the macroblocks are fed in order as shuffled to only one of the channels, for example, channel 1, while the other channel is not used.

After discrete cosine transformation, each macroblock is subjected to requantization which is performed by the encoding circuits 4-1 and 4-2 in the case of the HD signal. Requantization is carried out by selecting a quantization step size for each macroblock so that substantially the same amount of data is present in each buffer unit after requantization of all the macroblocks therein. Within each buffer unit, however, the quantization step size is varied so that macroblocks representing portions of the image which depict relatively fine image detail are requantized with a relatively small quantization step size, so that quantization noise does not become prominently visible in such areas of the picture. The requantized data is then encoded by the circuits 4-1 and 4-2 into the form of a variable length code by means of bidirectional Huffman coding or other technique. In the case of the SD image data, only the circuit 4-1 is used for requantization and encoding.

The encoded HD data are output by the encoding circuits 4-1 and 4-2 to corresponding framing circuits 5-1 and 5-2 wherein each variable length encoded macroblock is assembled into a sequence of seventy-six bytes preceded by a single byte of quantization data. The macroblocks as thus formatted by the framing circuits 5-1 and 5-2 are supplied as inputs to a multiplexer 6 for multiplexing with audio data, AUX data and subcode data for recording in the track format as shown in FIG. 3. The SD data is formatted in the same manner as the HD data, but using only the circuit 5-1.

An analog audio signal is received at an Audio In terminal and supplied therefrom to an A/D converter 7 for conversion to digital form. The digital audio data is output by the circuit 7 to an interleaving circuit 8 wherein the digital data are subjected to a data discrete process wherein parities are produced for respective lines of audio data, and then the lines (with parities appended) are interleaved with other such data according to a conventional process. By interleaving the audio data and parities, burst errors occurring during recording or reproduction result in relatively less distortion of the reproduced sound.

An AUX data generator 11 produces both data relating to the video signal (termed "VAUX data") and data relating to the audio signal (termed "AAUX data") under the control of a microprocessor 10, and supplies the VAUX data and AAUX data to the multiplexer 6. The VAUX data may include, for example, data indicating the format of the image data (NTSC, PAL, etc.), the date and time of recording, and copyright information, while the AAUX data may include, for example, data indicating the audio signal format (2-channel, 4-channel, etc.), the date and time of recording and copyright information for the audio signal. A subcode generator 13 serves to generate subcode data under the control of the microprocessor 10 and supplies the subcode data to the multiplexer 6. The subcode data is recorded for use mainly in carrying out high speed searching.

The multiplexer 6 multiplexes the video, audio, AUX and subcode data to be recorded in each pair of tracks in the following manner: first the multiplexer 6 supplies an equal amount of subcode data to each of the recording channels 120 and 122. Thereafter, the multiplexer 6 supplies a predetermined amount of VAUX data to each of the channels 120 and 122 for recording.

The multiplexer 6 then supplies audio and video data to the recording channels 120 and 122 in nine data units each formatted in the same fashion. Each of the data units includes two sync block units of audio data followed by thirty sync block units of video data. The multiplexer 6 supplies one of the audio sync block units followed by fifteen video sync block units to each of the two channels 120 and 122. In one embodiment, each audio sync block unit includes five bytes of AAUX data followed by seventy-two bytes of audio data, while each video sync block unit includes seventy-six bytes of video data representing the data of one macroblock, together with one byte of quantization data indicating the quantization step size of the accompanying video data. Accordingly, nine audio sync block units and one hundred thirty-five video sync block units of data are supplied to each channel for recording in a respective track.

Figure 6A:
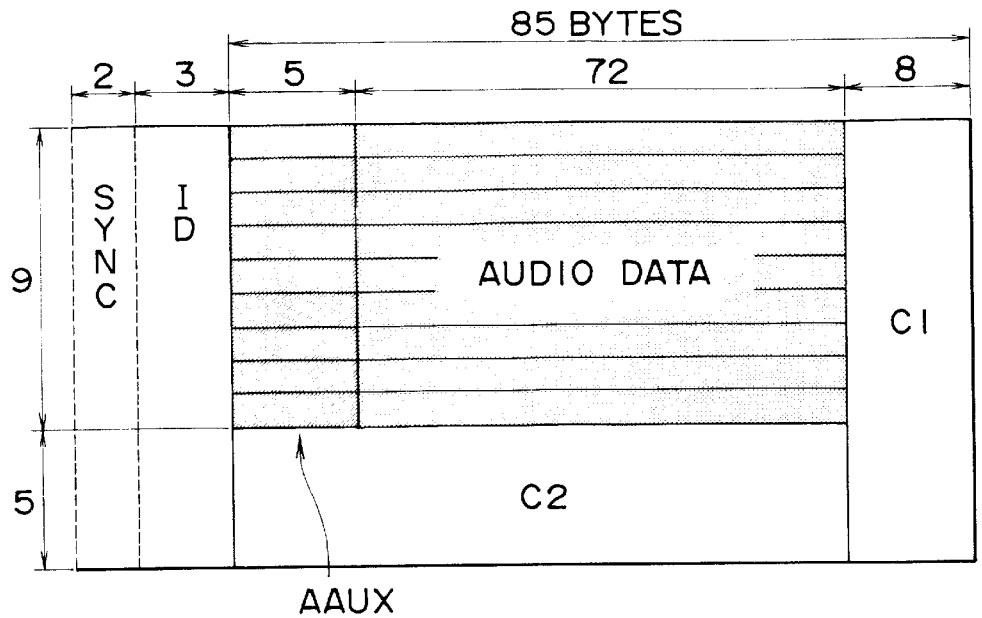
FIG. 6A is a schematic diagram of an audio data frame formed by the apparatus of FIG. 1.

The data output by the multiplexer circuit 6 are supplied to respective deshuffling circuits 14-1 and 14-2 of the recording channels 120 and 122 wherein the video data are stored in a frame memory and thereafter read out so that DCT blocks of the image data representing adjacent positions in the image are recorded at adjacent positions on tape. Each deshuffling circuit 14-1 and 14-2 supplies the video, audio, VAUX and subcode data to a respective parity generator circuit 15-1 and 15-2 where the video, audio and VAUX data are assembled into data frames and then parity data C1 and C2 are produced for each such data frame. In the case of the audio data, each parity generator 15-1 and 15-2 produces a single audio data frame for each track as shown in FIG. 6A by assembling the nine sync block units of audio data in a rectangular array as illustrated therein. Accordingly, nine such blocks of audio and AAUX data are arranged in a stacked array to form each audio data frame. Each of the parity generators 15-1 and 15-2 then adds horizontal parities C1 and vertical parities C2 to the stacked array produced thereby, as illustrated in FIG. 6A. The C2 parities have the same amount of data as five blocks of the audio and AAUX data.

Figure 6B:
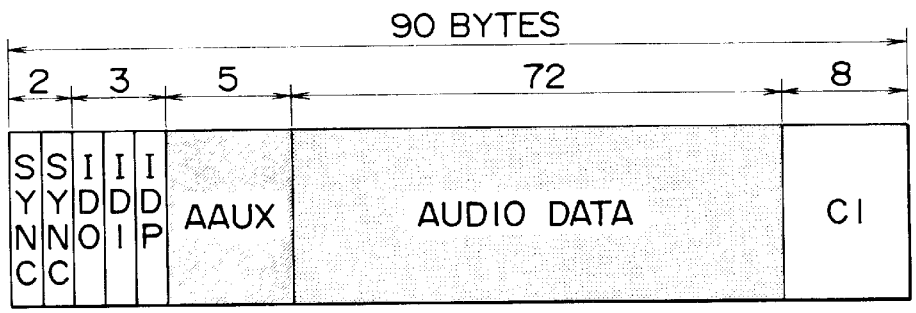
FIG. 6B is a schematic diagram of an audio sync block produced by the apparatus of FIG. 1.

This data is then read out by the parity generators 15-1 and 15-2 block-by-block. To each block, two preceding bytes of sync data and three bytes of ID data are added by a circuit (not shown for purposes of simplicity and clarity) in order to form sync blocks having the format as shown in FIG. 6B. Each sync block is then subjected to channel encoding by a respective one of channel encoding circuits 16-1 and 16-2, and then recorded on tape in the audio region of a respective track as illustrated in FIG. 3.

Figure 7A:
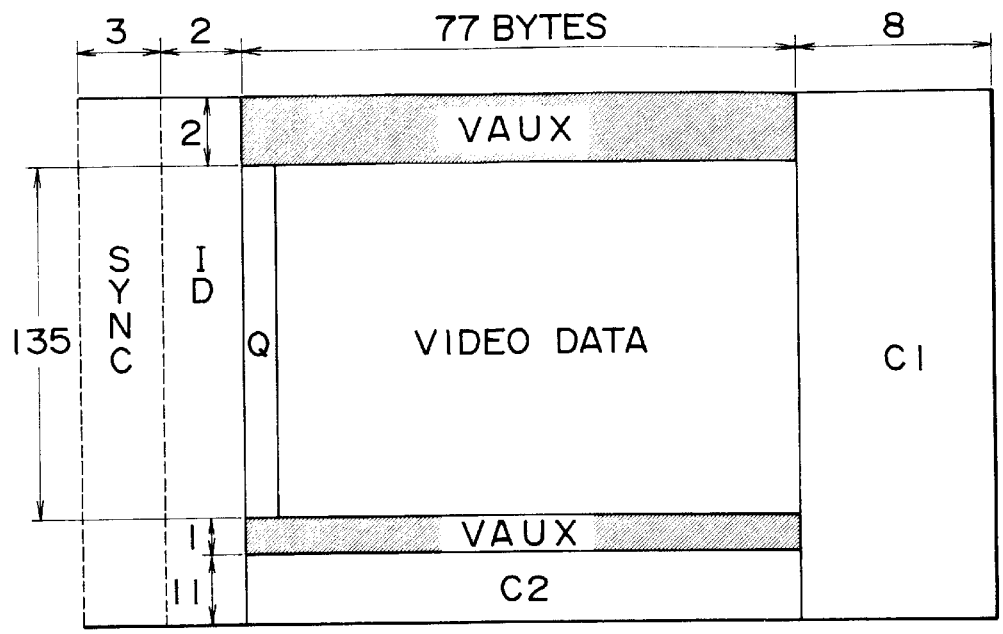
FIG. 7A is a schematic diagram of a video data frame formed by the apparatus of FIG. 1, and FIGS. 7B and 7C are schematic diagrams of video and VAUX sync blocks, respectively, produced by the apparatus of FIG. 1.

FIG. 7A is a schematic illustration of a video data frame which is formed by each of the parity generator circuits 15-1 and 15-2 so that it includes all 135 sync block units of video data for recording in a respective track as well as three sync block units of VAUX data to be recorded in the same track. Two of the sync block units of VAUX data are arranged as shown in FIG. 7A so that they precede the video data, while the third sync block unit of VAUX data is arranged so that it follows the sync block units of video data. Each parity generator 15-1 and 15-2 then adds horizontal parities C1 and vertical parities C2 to each video data frame, each horizontal parity C1 including eight bytes and the vertical parities C2 being formed as eleven blocks of data appended below the lower edge of the video data frame as illustrated in FIG. 7A.

Figure 7B:
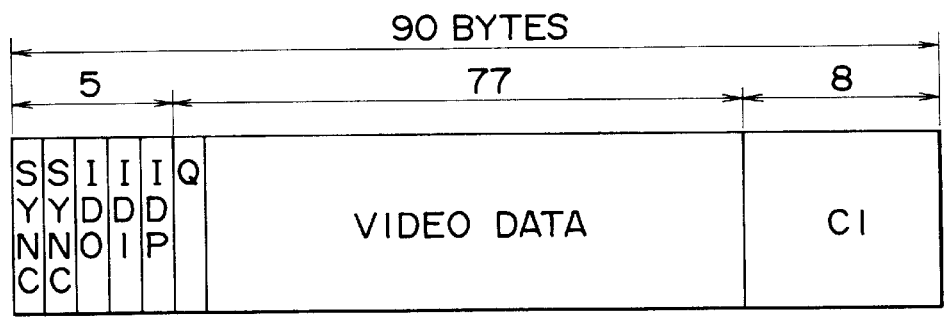
Figure 7C:
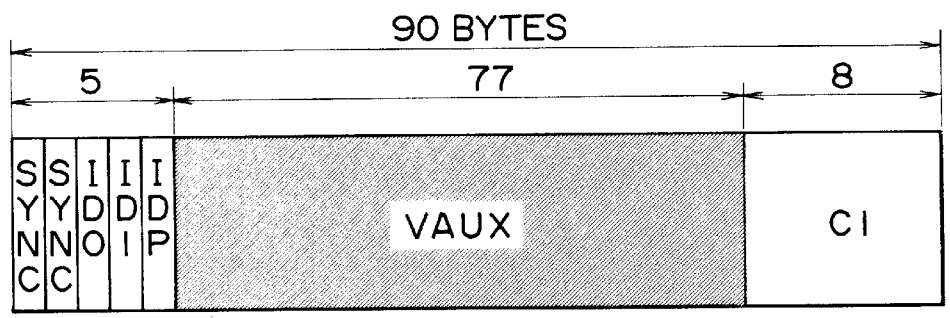

The parity generators 15-1 and 15-2 then output their video data arrays thus formed one sync block unit at a time. Each sync block unit as output by the parity generators is provided with two preceding bytes of sync data and three bytes of ID data in the same manner as the audio data frames, in order to form sync blocks of video data as illustrated schematically in FIG. 7B and to form sync blocks of VAUX data as illustrated schematically in FIG. 7C. After encoding by the circuits 16-1 and 16-2, the sync blocks are recorded in the video regions of respective tracks as illustrated in FIG. 3.

Figure 8:
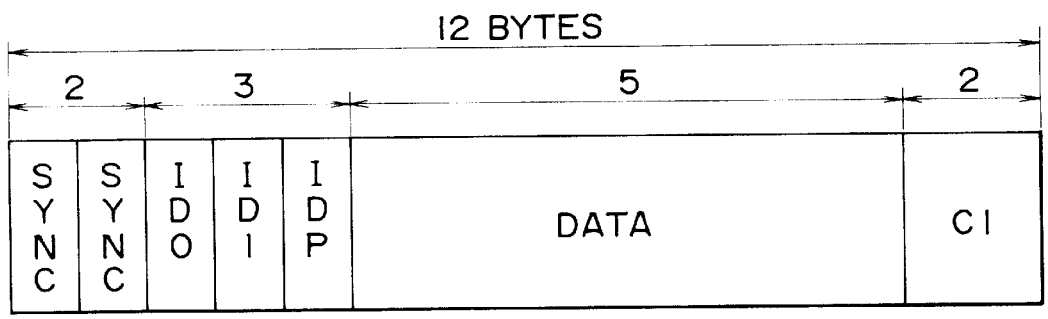
FIG. 8 is a schematic diagram of a subcode sync block produced by the apparatus of FIG. 1.

FIG. 8 is a schematic illustration of a subcode sync block which includes five bytes of subcode data and two bytes of C1 parities appended thereto by a respective one of the parity generators 15-1 and 15-2, as well as three bytes of ID data and two sync bytes added in the same manner as the audio and video data. After encoding by the circuits 16-1 and 16-2, twelve subcode sync blocks are recorded in the subcode region of each respective track as schematically illustrated in FIG. 3.

The apparatus of FIG. 1 also includes a digital interface (I/F) for receiving multiplexed digital image, audio, AUX and subcode data for recording by the apparatus of FIG. 1. Circuitry for receiving such digital data and demultiplexing the same will be described in greater detail hereinbelow together with a description of corresponding multiplexing and transmitting circuitry of the reproducing apparatus of FIG. 9.

Figure 9:
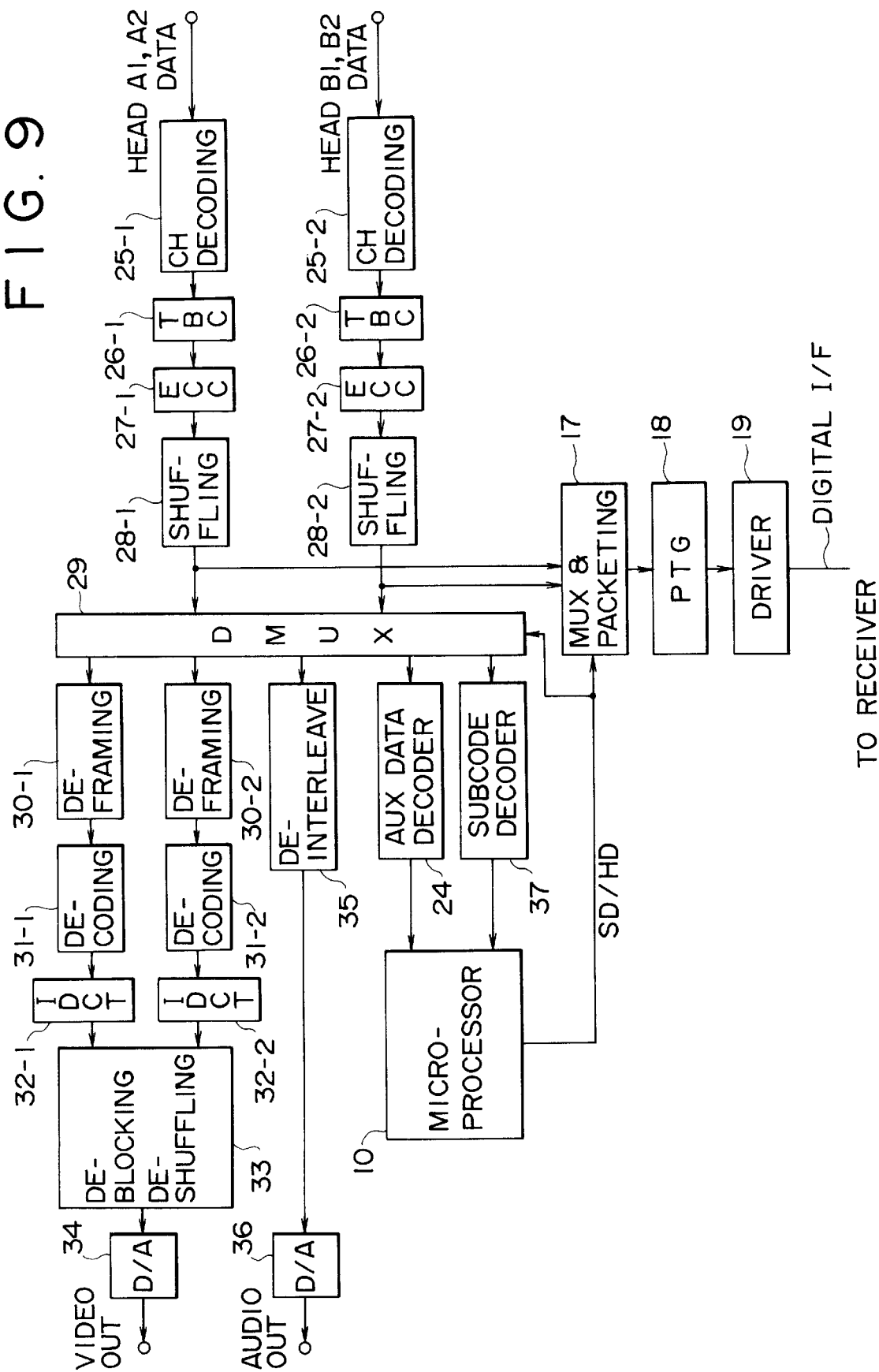
FIG. 9 is a block diagram of a reproducing apparatus in accordance with another embodiment of the present invention.

With reference now to the block diagram of FIG. 9, the reproducing apparatus thereof serves to reproduce digital image, audio, AUX and subcode data recorded in the manner described above in connection with the recording apparatus of FIG. 1. Accordingly, for reproducing recorded HD image data the reproducing apparatus of FIG. 9 receives reproduced data from heads A1, A2, B1, and B2 mounted on a rotating head drum of the type illustrated in FIG. 2, so that the heads A1 and A2 supply a first channel (designated "1") of the FIG. 9 apparatus with reproduced data, while the heads B1 and B2 supply a second channel (designated "2") of the FIG. 9 apparatus with data reproduced by the heads B1 and B2. However, when reproducing SD data the FIG. 9 apparatus only uses heads A1 and A2 to reproduce only one track at a time.

The channels 1 and 2 include corresponding circuit elements, the circuit elements of channel 1 each being designated by a respective reference numeral followed by the designation "-1", while the corresponding circuit element of channel 2 is designated by the same reference numeral but followed by the designation "-2". Channels 1 and 2 each include a channel decoding circuit 25-1 and 25-2, respectively, which decodes the data of channels 1 and 2, respectively, as encoded by the channel encoding circuits 16-1 and 16-2 of FIG. 1. Each channel also includes a time base correction (TBC) circuit 26-1 and 26-2 which corrects time base errors in the reproduced data in a conventional manner. Time base corrected data output by the circuits 26-1 and 26-2 are subject to error correction by respective circuits 27-1 and 27-2 utilizing the parities associated therewith as added by the parity generators 15-1 and 15-2 of FIG. 1.

The error corrected data are then supplied to respective shuffling circuits 28-1 and 28-2 which store reproduced video data in a frame memory and subsequently read out the stored video data to effect shuffling thereof as described above in connection with FIG. 5. In the event that the error correction circuits 27-1 and 27-2 have been unable to correct errors in the reproduced data, the erroneous data is supplied with an error flag. The shuffling circuits 28-1 and 28-2 respond to such error flags in the reproduced video data by retaining corresponding image data of a preceding frame, while ignoring the erroneous data, in order to carry out error concealment.

The data are output by the shuffling circuits 28-1 and 28-2 in predetermined sync block units which preferably each include the same amount of data, which is an amount equal to the amount of video and quantization data (or VAUX data) in each reproduced video sync block as well as the amount of audio and AAUX data in each reproduced audio sync block. So that the subcode sync block units will have the same amount of data, the subcode data from six subcode sync blocks as reproduced from tape are assembled to form a single sync block unit to which zero or dummy data are added.

Each of the shuffling circuits 28-1 and 28-2 outputs the data reproduced from a corresponding track in the order of two sync block units of subcode data, followed in turn by three sync block units of VAUX data and nine data units of audio and image data, each data unit including one audio data sync block unit followed by fifteen video data sync block units. Accordingly, in order to separate the image, audio, AUX and subcode data, a demultiplexing circuit 29 is provided which receives the data from the circuits 28-1 and 28-2 and distributes the image data from channel 1 to a deframing circuit 30-1 and the image data of channel 2 to a corresponding deframing circuit 30-2, while supplying the audio data to a deinterleaving circuit 35, the AUX data to an AUX data decoder 24 and the subcode data to a subcode decoder 37.

The deframing circuits 30-1 and 30-2 essentially reverse the process carried out by the circuits 5-1 and 5-2 of FIG. 1, so that the image data supplied by the circuits 30-1 and 30-2 are separated into variable length encoded data words. The variable length encoded data of channel 1 and channel 2 are supplied by the circuits 30-1 and 30-2 to decoding circuits 31-1 and 31-2, respectively. The decoding circuits carry out variable length decoding and inverse quantization employing the quantization data Q included with the recorded image data and supply the decoded and requantized data in the form of DCT blocks to respective inverse discrete cosine transformation (IDCT) circuits 32-1 and 32-2. Circuits 32-1 and 32-2 transform the data of each DCT block into the form of 8×8 pixel arrays which are then supplied to a deblocking and deshuffling circuit 33. The circuit 33 stores the received data blocks in a frame memory at memory locations corresponding to positions of the blocks within a corresponding image, in order to carry out deshuffling. The data is then read out from the frame memory as a sequence of lines in order to reconstitute a digital component video signal. The signal is then converted to analog form by a D/A converter 34 and output via a Video Out terminal.

However, when reproducing SD image data, the apparatus then uses only the circuits of channel 1 (i.e., those designated "-1"), while the circuits of channel 2 are disabled.

The audio signal supplied by the demultiplexing circuit 29 to the deinterleaving circuit 35 is deinterleaved thereby and then subjected to error correction using the parities corresponding to the deinterleaved audio data. The error corrected data is then supplied to a further D/A circuit 36 for reconversion to analog form. The analog audio data is then supplied at an Audio Out terminal.

The decoded AUX and subcode data are supplied by the circuits 24 and 37, respectively, to the microprocessor 10 which uses the same to control operations of the reproducing apparatus. In particular, the microprocessor 10 produces an SD/HD control signal by detecting the mode of the reproduced video data from the VAUX data included therein. The SD/HD control signal is supplied to the demultiplexer 29 so that it only supplies video data to channel 1 when SD video data is reproduced.

The reproducing apparatus of FIG. 9 also includes data transmission circuitry for multiplexing the reproduced data and supplying the same for transmission to a transmission line via a digital I/F and in a form capable of being received and demultiplexed by corresponding circuitry of the recording apparatus of FIG. 1 for recording thereby. More particularly, the outputs of the shuffling circuits 28-1 and 28-2 are supplied to a multiplexing and packeting circuit 17 via a respective circuit (not shown for purposes of simplicity and clarity) which adds new ID data to each sync block unit to form a digital interface (DIF) block. The circuit 17 is also supplied with the SD/HD control signal from the microprocessor 10. When the control signal supplied to the circuit 17 indicates that the reproduced data is HD image data, the circuit 17 responds by multiplexing the data received from the channels 1 and 2 on a time-divisional basis into a single data stream by alternately providing the data from the two channels in DIF block units.

For each of the channels, the circuit 17 employs two memories each having the capacity of one DIF block. At any given time, a first memory of each channel stores a DIF block as it is received by the circuit 17 while a second memory of each channel reads out the preceding DIF block of that channel to multiplex the same with a corresponding block of the other channel to form a combined data stream. In a subsequent DIF block interval, the functions of the first and second memories of each channel are reversed. In this manner, every other DIF block in the combined data stream is obtained from a respective one of the channels 1 and 2.

The circuit 17 also arranges the reproduced data in data subsequences, each of which includes all of the reproduced data from two respective tracks and has the format as illustrated schematically in FIG. 10. As shown in FIG. 10, the circuit 17 inserts two DIF blocks of header data H as the first DIF blocks of the data subsequence. These header blocks identify the source and destination of each subsequence, and include identification data identifying the image data therein as SD or HD data. The header DIF blocks are followed by four DIF blocks of subcode data wherein the index k indicates the channel or "section" from which the subcode, and the following data, were obtained. Following the subcode data in the data sequence, six DIF blocks of VAUX data are included. Following the VAUX data, nine data units of audio and video data comprise the remainder of the data subsequence. Each of the nine data units includes two DIF blocks of audio data (one from each channel) and thirty DIF blocks of image data (fifteen from each channel), so that the audio data from nine sync blocks reproduced from each of the tracks (including AAUX and audio data) and the image data of the one hundred and thirty-five image data sync blocks recorded in each of the two simultaneously reproduced tracks, are included in the data subsequence.

The data of each subsequence is supplied to a parity generator 18 which generates error detection parities therefor and supplies the subsequence and its associated parities to a driver circuit 19 where it undergoes channel coding in order to convert the data to a serial formal so that it is suitable for transmission via a digital I/F cable, such as a twisted pair cable. The data is then supplied by the circuit 19 to the digital I/F cable for transmission. Since the transmitted data is obtained from the output of the shuffling circuits 28-1 and 28-2, uncorrectable errors occurring in the reproduced data are concealed prior to transmission.

When the control signal from the microprocessor 10 indicates that the reproduced image data is SD data, the multiplexing function of the circuit 17 is disabled, so that the circuit 17 arranges the data of a single track into a data subsequence having substantially the same form as illustrated in FIG. 10, but instead including only a single DIF block of header data and one-half the amount of subcode, VAUX, video and audio data, since only a single track (instead of two tracks) of data is included in the subsequence. Each subsequence of SD data as thus formed is provided with parities by the circuit 18 and reformatted into serial form by the driver circuit 19, and then supplied thereby to the digital I/F cable for transmission.

With reference again to FIG. 1, the recording apparatus thereof includes a receiver 21 having an input for receiving data transmitted by the digital interface of the FIG. 9 apparatus. The receiver 21 converts the serial data to parallel form and carries out channel decoding thereof. The decoded data is then supplied to an error detection circuit 22 which indicates any errors therein by means of an error flag, and then outputs the data to a demultiplexing and depacketing circuit 23 with the detected erroneous data. In the circuit 23, demultiplexing of HD data is carried out by distributing alternate DIF block units of the data into their respective channels 1 and 2. The circuit 23 then supplies the data to the multiplexing circuit 6 from which the data of each channel are supplied to a corresponding one of the recording channels 120 and 122 to be processed for recording in the same manner as data received at the Video In and Audio In terminals of the FIG. 1 apparatus. Where SD data is received, however, the demultiplexing function of the circuit 23 is disabled so that after depacketing, the data is simply supplied in a single channel to the multiplexing circuit 6. The circuit 6 supplies the single channel of data to only one of the recording channels 120 and 122 in this case. The circuit 6 detects whether the received data is SD or HD data based on the identification data in the header DIF blocks.

Control of the multiplexing circuit 6 to operate in the foregoing manner is exercised by the microprocessor 10 which supplies a control signal to the multiplexer 6 for indicating whether the received image data is SD data or HD data. The microprocessor 10 produces the control signal based upon VAUX data received by the microprocessor 10 from an AUX data decoder 24 which is supplied with the data output by the circuit 23 from the multiplexer 6.

From the foregoing, it will be appreciated that the apparatus of FIGS. 1 and 2 provide the ability to transmit and receive both HD image data and SD image data, along with associated audio and other data over a common digital interface, and between recording and reproducing apparatus which employ relatively inexpensive circuitry for processing HD image data for recording or as reproduced.

With reference now to FIG. 11, a recording apparatus is illustrated in block form therein which is provided with digital communication circuits for transmitting digital audio and video data produced from input analog audio and video data. The recording apparatus of FIG. 11 is constructed and operates in the same fashion as the apparatus of FIG. 1, with the exception of the digital communication circuits of the FIG. 11 apparatus which are described in detail below, and except for the manner in which the SD or HD mode of operation is selected. In the apparatus of FIG. 11, circuits corresponding to those illustrated in FIG. 1 are provided with the same reference numerals.

In greater detail, a user operable switch 130 has a moveable terminal coupled with the channel 2 output of the blocking and shuffling circuit 2, as well as a fixed terminal coupled with the input of DCT circuit 3-2. If the user operates the switch 130 to select the HD mode, the switch 130 connects the channel 2 output of the blocking and shuffling circuit 22 to the input of the DCT circuit 3-2 so that the second channel of the HD image data is supplied to the processing circuitry of channel 2. If instead the user operates the switch 130 to select the SD mode of operation, the second channel output from the blocking and shuffling circuit 2 is disconnected from the DCT circuit 3-2, since the SD image data is supplied only to channel 1. The switch 130 is mechanically coupled with a further switch (not shown for purposes of simplicity and clarity) which serves to supply an appropriate SD/HD control signal to the multiplexer 6 indicating whether the user has selected the HD or SD mode of operation. If the HD mode of operation is selected, the multiplexer 6 supplies data both to the deshuffling circuit 14-1 and the deshuffling circuit 14-2. However, if the SD mode is selected, the multiplexer 6 supplies data only to the deshuffling circuit 14-1.

The apparatus of FIG. 11 also includes a multiplexing and packeting circuit 17', a parity generator 18 and a driving circuit 19 corresponding to the circuits 17, 18 and 19 of the FIG. 9 apparatus (except as described below for the circuit 17') and coupled to one another in the same fashion. The first input of the circuit 17' receives the channel 1 output of the multiplexer 6 plus ID data generated as discussed above in connection with the embodiment of FIG. 9, while a second input of the circuit 17' receives the channel 2 data output from the multiplexer 6 with corresponding ID data. In addition, the circuit 17' adds zero data to the subcode data to form subcode DIF blocks of predetermined size. The control signal supplied to the multiplexer 6 for indicating the SD or HD mode of operation is also supplied to the circuit 17'. In the HD mode, the circuit 17' multiplexes the data supplied by the multiplexer 6 through channels 1 and 2 and forms a subsequence including the same data as that which is to be recorded simultaneously in two tracks of a recording medium by the FIG. 11 apparatus, plus two DIF blocks of header data at the beginning of the subsequence. The data subsequence as output by the circuit 17' thus has the same form as that illustrated in FIG. 10. The parity generator 18 and the driver 19 operate in the same fashion as the corresponding circuits of the FIG. 9 apparatus in order to transmit the data in the same manner.

In the SD mode of operation, the circuit 17' receives data only from channel 1 which is not multiplexed by the circuit 17'. The SD data corresponding to the data of one track is formed into a subsequence including one DIF block of header data in the same manner as explained above for the FIG. 9 embodiment. Parity data is then added to the subsequence by the circuit 18 and the driver circuit 19 encodes the data and parities for transmission in serial form in the same manner as discussed above in connection with the apparatus of FIG. 9.

The present invention, therefore, provides a relatively simple and straightforward data communication apparatus for transmitting both HD and SD image data by means of a simple transmission line, such as a twisted pair or other device. Since the HD data is multiplexed, it is possible to use common transmission circuitry for transmitting the SD and HD image data. Where the data is multiplexed in DIF block units, the required memory capacity for multiplexing and demultiplexing the data is advantageously simplified since each memory need store only one DIF block.

In reproducing apparatus in certain embodiments of the present invention, since error concealment is carried out when the data are shuffled, additional apparatus for carrying out this function need not be supplied in the communication or other circuitry.

Since the data is transmitted in subsequences corresponding to a predetermined amount of data reproduced from a predetermined number of tracks at a fixed rate, the design and implementation of the communication circuitry is substantially facilitated.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for reproducing digital image data, comprising:

means for simultaneously reproducing a first portion of the digital image data in a first track of a recording medium and a second portion of the digital image data in a second track of the recording medium, the first and second tracks each storing a predetermined amount of data therein;

shuffling means for shuffling the first and second portions of the digital image data;

digital interface means receiving the shuffled first and second portions of the image data for forming therefrom first output image data and for providing the same to a transmission line for supply to a recording and/or reproducing apparatus, said, digital interface means including multiplexing means for multiplexing the shuffled first and second portions of the image data on a time-divisional basis in block data units to produce said first output image data, each of the block data units including an amount of data which is less than the predetermined amount of data stored in either of the first and second tracks;

deshuffling means for deshuffling the shuffled first and second portions of the image data so as to produce second output image data; and an output terminal for outputting the second output image data.

2. The apparatus of claim 1, wherein each of the first and second data portions includes substantially all of the digital image data stored in a respective one of the first and second tracks.

3. The apparatus of claim 2, wherein the reproducing means is operative to reproduce the first and second portions of the image data from the first and second tracks in the form of a plurality of sync blocks, each of the sync blocks including a predetermined sync block unit of image data, and wherein the multiplexing means is operative to multiplex the image data to form successive pairs of sync block units, each sync block unit of each pair being obtained from a respective one of the shuffled first and second portions of the digital image data.

4. The apparatus of claim 3, wherein the multiplexing means is operative to produce multiplexed image data as a data stream comprised alternately of sync block units obtained from the shuffled first and second portions of the digital image data.

5. The apparatus of claim 3, wherein the reproducing means is operative to simultaneously reproduce a first portion of digital audio data recorded in the first track and a second portion of the digital audio data recorded in the second track, the first and second portions of the digital audio data being reproduced as a plurality of sync blocks each including a sync block unit of digital audio data, the multiplexing means being operative to multiplex the shuffled first and second portions of the digital audio data to form pairs of sync block units, each sync block unit of each pair being obtained from a respective one of the shuffled first and second portions of the digital audio data, the apparatus further comprising means for producing header data, the multiplexing means being operative to form the digital image data and digital audio data into a subsequence including two sync block units of header data and nine data units of image and audio data including substantially all of the image and audio data reproduced from the first and second tracks by the reproducing means, each of the nine data units including a pair of audio sync block units and fifteen pairs of image data sync block units.

6. The apparatus of claim 5, wherein the reproducing means is operative to reproduce subcode data from the first and second tracks, and the multiplexing means is operative to multiplex pairs of subcode data sync block units such that each subcode data sync block unit of each pair includes subcode data reproduced from a respective one of the first and second tracks, the multiplexing means being operative to insert two pairs of subcode data sync block units into the subsequence following the two sync block units of header data and preceding the nine data units of image and audio data.

7. The apparatus of claim 6, wherein the reproducing means is operative to reproduce video auxiliary data from the first and second tracks in the form of a plurality of sync blocks each including a sync block unit of video auxiliary data, the multiplexing means being operative to multiplex pairs of video auxiliary data sync block units such that each sync block unit of each pair is formed of video auxiliary data reproduced from a respective one of the first and second tracks, the multiplexing means being operative to include three pairs of video auxiliary data sync block units in the subsequence following the two pairs of subcode data sync block units and preceding the nine data units of image and audio data.

8. A digital video reproducing apparatus for reproducing standard definition (SD) digital image data and high definition (HD) digital image data from a recording medium, said apparatus comprising:

first reproducing means including a first set of reproducing heads for reproducing said SD digital image data from said recording medium;

second reproducing means including said first set of reproducing heads and a second set of reproducing heads for reproducing said HD digital image data from said recording medium;

first channel processing means for processing the digital image data reproduced by said first set of reproducing heads to form first processed digital image data, said first channel processing means including first shuffling means for shuffling said first processed digital image data;

second channel processing means for processing the digital image data reproduced by said second set of reproducing heads to form second processed digital image data, said second channel processing means including second shuffling means for shuffling said second processed digital image data;

deshuffling means for deshuffling the shuffled first and second processed digital image data so as to produce first output image data;

an output terminal for outputting said first output image data; and digital interface means receiving the shuffled first and second processed digital image data for forming therefrom second output image data and for providing the same to a transmission line for supply to a recording and/or reproducing apparatus, said digital interface means including means for producing a SD/HD control signal and multiplexing means responsive to said SD/HD control signal for multiplexing said shuffled first and second processed digital image data so as to form said second output image data when said HD digital image data is reproduced and for forming said second output image data from only the shuffled first processed digital image data when said SD digital image data is reproduced.

9. The apparatus of claim 3, further comprising first error correcting means for correcting errors in the first portion of the digital image data and second error correcting means for correcting errors in the second portion of the digital image data, and wherein the multiplexing means is operative to multiplex the error corrected first and second portions of the digital image data.

10. The apparatus of claim 9, wherein the reproducing means serves to reproduce the first and second portions of the digital image data in the form of encoded, orthogonally transformed image data, and the apparatus further comprises first decoding means for decoding the first portion of the digital image data, second decoding means for decoding the second portion of the digital image data, first inverse orthogonal transforming means for inverse orthogonal transforming the decoded first portion of the digital image data, and second inverse orthogonal transforming means for inverse orthogonal transforming the decoded second portion of the digital image data, and wherein the deshuffling means deshuffles and combines the inverse transformed first and second portions of the digital image data to produce the second output image data.

11. The apparatus of claim 9, wherein the first and second error correcting means are further operative to include error flags to indicate portions of the digital image data which cannot be error corrected, and wherein the shuffling means shuffles the error corrected first and second portions of the digital image data, the shuffling means including means for carrying out error concealment of any portions of the digital image data indicated by said error flags.

12. A method for reproducing and transmitting digital image data, comprising the steps of:

simultaneously reproducing a first portion of the digital image data in a first track of a recording medium and a second portion of the digital image data in a second track of the recording medium, the first and second tracks each storing a predetermined amount of data therein;

shuffling the first and second portions of the digital image data;

forming first output image data from the shuffled first and second portions of the image data and providing the same to a transmission line for supply to a recording and/or reproducing apparatus, said step of forming including multiplexing the shuffled first and second portions of the image data on a time-divisional basis in block data units to produce said first output image data, each of the block data units including an amount of data which is less than the predetermined amount of data stored in either of the first and second tracks;

deshuffling the shuffled first and second portions of the image data so as to produce second output image data; and outputting the second output image data.

* * * * *